M. J. SALTZMAN.
POWER TRANSMISSION DEVICE.
APPLICATION FILED AUG. 2, 1919.

1,342,649.

Patented June 8, 1920.

Witness

Inventor
M. J. Saltzman.
By C. A. Snow & Co.
Attorneys

UNITED STATES PATENT OFFICE.

MELVILLE J. SALTZMAN, OF ALVADA, OHIO.

POWER-TRANSMISSION DEVICE.

1,342,649.

Specification of Letters Patent. Patented June 8, 1920.

Application filed August 2, 1919. Serial No. 314,970.

*To all whom it may concern:*

Be it known that I, MELVILLE J. SALTZMAN, a citizen of the United States, residing at Alvada, in the county of Seneca and State of Ohio, have invented a new and useful Power-Transmission Device, of which the following is a specification.

This invention relates to power jacks or transmission devices and more particularly to power transmission devices adapted for use in connection with automobiles and the like.

An object of this invention is to provide a portable power transmission device that may be employed for transmitting the power developed in an automobile engine to various mechanical devices and utilizing this power for performing useful work.

Another object of this invention is to provide a power transmission device that may be conveniently attached to the rear or drive wheels of an automobile, and which may be readily and conveniently detached therefrom.

A further object of this invention is to provide a power transmission device of generally improved construction, whereby the device will be simple, durable, and inexpensive in construction, as well as convenient, practical, serviceable and efficient in its use.

The invention has been illustrated in its preferred embodiments in the accompanying drawings, wherein.

Figure 1:
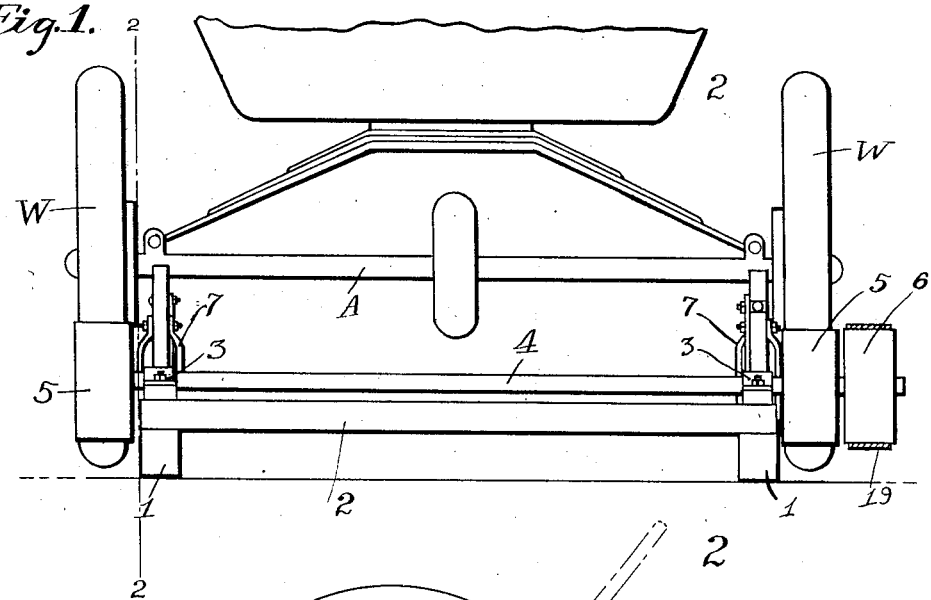
Figure 1, is a rear view of the device showing it in use in connection with the usual automobile construction.

Referring to the drawing there is shown a frame comprising side members or sills 1 and end rails or strips 2. Opposed bearing members 3 are supported by the side members 1, and a transversely disposed shaft 4 is journaled in the bearings 3. Drive wheels 5 are keyed or otherwise secured to the shaft 4 at the outer sides of the side members 1, and a driven pulley 6 is secured to one terminal of this shaft. Standards or uprights 7 are secured to and supported by the side members 1, and these uprights have levers 8 fulcrumed thereto by means of bolts or other securing devices 9. The handle ends of the levers 8 extend rearwardly from the uprights 7 and have securing links 10 pivotally secured thereto as indicated at 11, and the outer or lower terminals of the links 10 have angularly disposed notches 12 formed therein, which are adapted to engage pins or studs 13 extending from the side members 1. Supporting legs 14 are pivotally secured to the levers 8 adjacent their fulcrums 9, as indicated at 15, and retractile springs 16 have their lower terminals connected with the intermediate portions of the legs 14, while the upper terminals of these springs are secured to the levers 8 at a point adjacent their fulcrums 9. The ends of the levers 8 which are remote from the handle portions are provided with curved seats 17, which are adapted to receive the rear axle A of the usual automobile structure. Each curved seat 17 has one relatively high bearing face or portion 18, and this relatively high curved portion 18, is formed to that side of the axle A which is remote from the transversely disposed shaft 4, the purpose of which will be hereinafter disclosed.

Figure 2:
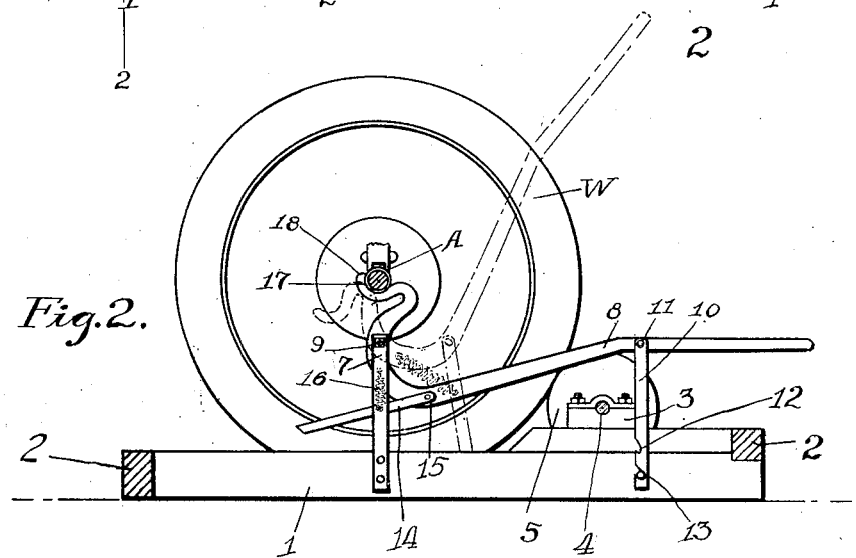
Fig. 2, is a longitudinal sectional view taken on a line 2—2 of Fig. 1.

In use the power transmission device is positioned adjacent the rear end of the automobile, and then the lower terminals of the supporting legs 14 are placed into engagement with the side member 1 thereby supporting the handle ends of the levers 8 in elevated positions, and the curved seat 17 in their lowered positions below the plane of the rear axle A, as shown by dotted lines in Fig. 2. Now the device is moved forwardly until the power wheels 5 engage the rear wheels W of the automobile. In this position the handle ends of the levers 8 are slightly elevated which moves the lower terminals of the links 14 from engagement from the side members 1 and allows the retractile spring 16 to raise the legs 14 and consequently permitting the seats 17 to move into engagement with the rear axle A. By further downward movement of the handle ends of the levers 8 the rear wheels W are lifted from the floor or ground G and supported in engagement with the drive wheels 5, and the levers 8 are locked in this position by simply moving the notches 13 of the links 10 into engagement with the pin 13. By providing that side of the curved seat 17, which is remote from the drive wheels 5 with a relatively high portion 18 the rear axle A is forced toward the drive wheel 5 as the rear wheels W of the automobile are lifted from the floor. Power may now be imparted to any selected device by connecting this device with the driven wheel 6 by means of a suitable belt or cable 19.

Having thus described my invention what is claimed is:

1. A power transmitting device including a frame, opposed bearing members supported by the frame, a shaft journaled in the bearings, a drive wheel secured to the shaft, a pulley secured to the shaft, an upright supported by the frame, a lever fulcrumed to the upright, said lever having a curved seat formed thereon, a supporting leg pivotally secured to the lever and means for automatically moving the supporting leg from its supporting position.

2. A power jack including a frame, opposed bearings supported by the frame, a transversely disposed shaft journaled in the bearings, a drive wheel keyed to the shaft, a pulley secured to the said shaft, an upright supported by the frame, a lever fulcrumed to the said upright, a curved seat formed on the lifting portion of the lever and adapted to engage the axle of the rear wheels of an automobile, a supporting leg pivotally secured to the handle portion of the lever and the outer terminal of the leg being adapted to engage the frame to support the handle end of the lever in its elevated position, a retractile spring having one terminal secured to the supporting leg and its opposed terminal secured to the lever and adapted to support the said leg in its inoperative position, pins extending from the said frame, and a link having one terminal pivotally secured to the handle end of the lever, said link having notches formed adjacent its opposed terminal to engage the said pins to thereby support the rear wheel of the automobile in a lifted position and into engagement with the said drive wheel.

In testimony that I claim the foregoing as my own, I have hereto affixed my signature in the presence of two witnesses.

MELVILLE J. SALTZMAN.

Witnesses:
SAMUEL H. KREBS,
H. V. THOMAS.